US012595405B2

(12) United States Patent
Alenezi et al.

(10) Patent No.: US 12,595,405 B2

(45) Date of Patent: Apr. 7, 2026

(54) METHODS FOR ACIDIZING SUBSURFACE FORMATIONS UTILIZING CORROSION INHIBITOR COMPOUNDS

(71) Applicant: Saudi Arabian Oil Company, Dhahran (SA)

(72) Inventors: Abdullah S. Alenezi, Dhahran (SA); Reem A. Alalwan, Dammam (SA); Muhammad Imran Ul-haq, Dhahran (SA); Nayef M. Alanazi, Dhahran (SA); Rashed Mohammad Aleisa, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 174 days.

(21) Appl. No.: 18/488,660

(22) Filed: Oct. 17, 2023

(65) Prior Publication Data

US 2025/0122419 A1 Apr. 17, 2025

(51) Int. Cl.
*C09K 8/54* (2006.01)

(52) U.S. Cl.
CPC .................................... *C09K 8/54* (2013.01)

(58) Field of Classification Search
None
See application file for complete search history.

(56) References Cited

U.S. PATENT DOCUMENTS

| | | | |
|---|---|---|---|
| 2,668,100 A | | 2/1954 | Luvisi |
| 2,736,658 A | | 2/1956 | Pfohl et al. |
| 2,955,083 A | | 10/1960 | Levin |
| 3,283,005 A | | 11/1966 | Abend et al. |
| 3,365,477 A | | 1/1968 | Gee et al. |
| 3,623,979 A | | 11/1971 | Maddox, Jr. et al. |
| 3,629,104 A | | 12/1971 | Maddox, Jr. |
| 3,945,824 A | * | 3/1976 | Sakai ....................... G03C 7/24 430/140 |
| 3,981,682 A | | 9/1976 | Ward et al. |
| 4,028,117 A | | 6/1977 | Moat |
| 4,148,605 A | | 4/1979 | Andress, Jr. |
| 4,214,876 A | | 7/1980 | Garth et al. |
| 4,469,873 A | | 9/1984 | Nieh |

(Continued)

FOREIGN PATENT DOCUMENTS

| | | |
|---|---|---|
| BR | 112017002002 B1 | 3/2022 |
| CA | 2196650 A1 | 8/1998 |

(Continued)

OTHER PUBLICATIONS

Demberelnyamba et al., "New Eposide Molten Salts: Key Intermediates for Designing Novel Ionic Liquids", Chemistry Letters, vol. 33, No. 5, 2004.

(Continued)

*Primary Examiner* — Jeffrey D Washville
(74) *Attorney, Agent, or Firm* — Dinsmore & Shohl LLP

(57) ABSTRACT

A subsurface formation may be acidized by a method that may comprise injecting an acidic treatment fluid into an subsurface formation through a tubing of an extraction well, thereby exposing at least a portion of the tubing to an acidic environment. At least a portion of the tubing may be contacted by a corrosion inhibitor compound that may have the general structure as described herein.

20 Claims, 4 Drawing Sheets

(56) References Cited

U.S. PATENT DOCUMENTS

| | | | |
|---|---|---|---|
| 4,515,708 | A | 5/1985 | Haslegrave et al. |
| 4,637,899 | A | 1/1987 | Kennedy, Jr. |
| 4,672,118 | A | 6/1987 | Fisk et al. |
| 4,734,277 | A | 3/1988 | Login |
| 4,744,948 | A | 5/1988 | Incorvia |
| 4,784,796 | A | 11/1988 | Treybig et al. |
| 4,812,263 | A | 3/1989 | Login |
| 4,993,693 | A | 2/1991 | Karl-Heinz et al. |
| 5,000,873 | A | 3/1991 | Fisk et al. |
| 5,130,034 | A | 7/1992 | Williams et al. |
| 5,209,859 | A | 5/1993 | Williams et al. |
| 5,292,480 | A | 3/1994 | Fischer et al. |
| 5,336,441 | A | 8/1994 | Shah et al. |
| 5,611,997 | A | 3/1997 | Langley et al. |
| 5,756,004 | A | 5/1998 | Brezinski |
| 5,763,368 | A | 6/1998 | Brezinski |
| 6,118,000 | A | 9/2000 | Frenier |
| 6,303,079 | B1 | 10/2001 | Meyer |
| 6,315,045 | B1 | 11/2001 | Brezinski |
| 7,057,050 | B2 | 6/2006 | Meyer |
| 7,951,754 | B2 | 5/2011 | Tiwari et al. |
| 8,933,000 | B2 | 1/2015 | Walker |
| 9,074,289 | B2 | 7/2015 | Malwitz et al. |
| 9,238,588 | B2 | 1/2016 | Harrington et al. |
| 9,382,467 | B2 | 7/2016 | Meyer et al. |
| 9,434,911 | B2 | 9/2016 | Bennett et al. |
| 9,816,024 | B2 | 11/2017 | Jafar Mazumder et al. |
| 9,868,894 | B1 | 1/2018 | Jafar Mazumder et al. |
| 10,221,368 | B2 | 3/2019 | Benitez Aguilar et al. |
| 10,323,327 | B2 | 6/2019 | Obot et al. |
| 10,563,114 | B2 | 2/2020 | Mandal et al. |
| 10,604,710 | B2 | 3/2020 | Moloney |
| 10,626,319 | B1 | 4/2020 | Obot et al. |
| 10,920,534 | B2 | 2/2021 | Hurtevent et al. |
| 11,518,932 | B2 | 12/2022 | Quraishi et al. |
| 2002/0030018 | A1 | 3/2002 | Brezinski |
| 2006/0013798 | A1 | 1/2006 | Henry et al. |
| 2007/0010404 | A1 | 1/2007 | Welton et al. |
| 2008/0308770 | A1* | 12/2008 | Tiwari .................. C23F 11/149 544/335 |
| 2010/0219379 | A1 | 9/2010 | Acosta et al. |
| 2011/0100630 | A1 | 5/2011 | Evans et al. |
| 2013/0233543 | A1 | 9/2013 | Overkempe et al. |
| 2016/0017726 | A1 | 1/2016 | Bochiechio |
| 2016/0177170 | A1 | 6/2016 | Janak et al. |
| 2016/0237334 | A1 | 8/2016 | Gunawan et al. |
| 2018/0282606 | A1 | 10/2018 | Rodgers et al. |
| 2020/0033987 | A1 | 1/2020 | Fu |
| 2020/0318243 | A1 | 10/2020 | Obot et al. |
| 2020/0362226 | A1* | 11/2020 | Obot ........................ C09K 8/74 |
| 2020/0362227 | A1 | 11/2020 | Obot et al. |
| 2022/0333002 | A1 | 10/2022 | Shimek |

FOREIGN PATENT DOCUMENTS

| | | | |
|---|---|---|---|
| CA | 2580595 | C | 11/2007 |
| CA | 2656344 | C | 8/2009 |
| CN | 102382638 | A | 3/2012 |
| CN | 103922997 | B | 2/2016 |
| CN | 107418549 | B | 3/2020 |
| CN | 111362867 | A | 7/2020 |
| EP | 1690960 | A2 | 8/2006 |
| GB | 2196749 | A | 5/1988 |
| JP | 2000038690 | A | 2/2000 |
| JP | 2000096049 | A | 4/2000 |
| JP | 3207183 | U | 10/2016 |
| WO | 9833953 | A1 | 8/1998 |
| WO | 2006034101 | A1 | 3/2006 |

OTHER PUBLICATIONS

Shibata et al., "Reactions of Long-Chain Alkyleneoxide and Amino Compounds", Department of Applied Chemistry, vol. 68, Issue 5, pp. 957-960, 1965.

Williams et al., "Acidizing Fundamentals", Society of Petroleum Engineers of AIME, 131 pages, 1979.

* cited by examiner

METHODS FOR ACIDIZING SUBSURFACE FORMATIONS UTILIZING CORROSION INHIBITOR COMPOUNDS

TECHNICAL FIELD

The present disclosure relates to natural resource extraction and, more specifically, to subterranean hydrocarbon extraction.

BACKGROUND

In oil and gas drilling, wellbore stimulation is a common treatment performed in subsurface formations to enhance or restore the productivity of oil and gas from a wellbore. Acid treatments may be used for wellbore stimulation in a process known as acidizing. Acidizing refers to a stimulation treatment technique in which an acidic treatment fluid is delivered into the subsurface formation to dissolve acid-soluble materials. This may increase the permeability of a treatment zone and enhance well production by increasing the effective wellbore radius. In such processes, acidizing may include pumping acid into a wellbore or subsurface formation to improve a well's productivity.

SUMMARY

Acidizing processes generally increase the total stimulated volume of subsurface formations, typically correlating to an increase in hydrocarbon production and recovery. However, acidizing may be highly corrosive to downhole equipment, such as tubing, such as carbon steel tubing. Described herein are corrosion-resistant compounds that may be utilized in downhole environments during acidizing treatments to mitigate corrosion in downhole equipment such as tubing. The corrosion-resistant compounds described herein may, in some embodiments, have better performance in corrosion inhibition than conventional methods and/or materials utilized to mitigate corrosion. In particular, the corrosion inhibiting compounds described herein may have better performance in corrosion-resistance than conventional methods and/or materials utilized to mitigate corrosion in environments found in downhole conditions during acidizing treatments, such as relatively high pressure and/or relatively high temperature, in the presence of strong acids.

According to one or more embodiments of the present disclosure, a subsurface formation may be acidized by a method that may comprise injecting an acidic treatment fluid into an subsurface formation through a tubing of an extraction well, thereby exposing at least a portion of the tubing to an acidic environment. At least a portion of the tubing may be contacted by a corrosion inhibitor compound that may have the general structure of Chemical Structure #1, described herein. In chemical Structure #1, described herein, $R_1$ may be a $C_1$-$C_{18}$ alkyl group, a $C_1$-$C_{18}$ hydroxyl alkyl group, a $C_1$-$C_{18}$ alkenyl group, a $C_1$-$C_{18}$ internal alkynl group, a $C_1$-$C_{18}$ acryl group, a $C_1$-$C_{18}$ cycloalkyl group, or a $C_1$-$C_{18}$ functional alkyl group. Also, in chemical Structure #1, described herein, $R_A$, $R_B$, $R_C$, $R_D$, and $R_E$ may each be independently chosen from hydrogen, a $C_1$-$C_{18}$ alkyl group, a $C_1$-$C_{18}$ hydroxyl alkyl group, a $C_1$-$C_{18}$ alkenyl group, a $C_1$-$C_{18}$ alkynl group, a $C_1$-$C_{18}$ acryl group, a $C_1$-$C_{18}$ cycloalkyl group, or a $C_1$-$C_{18}$ functional alkyl group.

According to one or more additional embodiments of the present disclosure, a subsurface formation may be acidized by a method that may comprise injecting an acidic treatment fluid into an subsurface formation through a tubing of an extraction well, thereby exposing at least a portion of the tubing to an acidic environment. At least a portion of the tubing may be contacted by a corrosion inhibitor compound that may have the general structure of Chemical Structure #2, described herein. In chemical Structure #1, described herein, $R_1$ may be a $C_1$-$C_{18}$ alkyl group, a $C_1$-$C_{18}$ hydroxyl alkyl group, a $C_1$-$C_{18}$ alkenyl group, a $C_1$-$C_{18}$ internal alkynl group, a $C_1$-$C_{18}$ acryl group, a $C_1$-$C_{18}$ cycloalkyl group, or a $C_1$-$C_{18}$ functional alkyl group. Also, in chemical Structure #2, described herein, $R_A$, $R_B$, $R_C$, $R_D$, and $R_E$ may each independently be chosen from hydrogen, a $C_1$-$C_{18}$ alkyl group, a $C_1$-$C_{18}$ hydroxyl alkyl group, a $C_1$-$C_{18}$ alkenyl group, a $C_1$-$C_{18}$ alkynl group, a $C_1$-$C_{18}$ acryl group, a $C_1$-$C_{18}$ cycloalkyl group, or a $C_1$-$C_{18}$ functional alkyl group.

These and other embodiments are described in more detail in the detailed description. It is to be understood that both the foregoing general description and the following detailed description present embodiments of the presently disclosed technology, and are intended to provide an overview or framework for understanding the nature and character of the presently disclosed technology as it is claimed. The accompanying drawings are included to provide a further understanding of the presently disclosed technology and are incorporated into and constitute a part of this specification. The drawings illustrate various embodiments and, together with the description, serve to explain the principles and operations of the presently disclosed technology. Additionally, the drawings and descriptions are meant to be merely illustrative, and are not intended to limit the scope of the claims in any manner.

BRIEF DESCRIPTION OF THE DRAWINGS

The following detailed description of specific embodiments of the present disclosure can be best understood when read in conjunction with the following drawing(s), where like structure is indicated with like reference numerals and wherein.

DETAILED DESCRIPTION

Embodiments of the present disclosure are directed to methods for acidizing subsurface formations, where particular corrosion inhibitor compounds are utilized to reduce corrosion of downhole metal surfaces, such as steel tubing.

As described herein, corrosion may refer to a process in which a material is oxidized by substances in the environment that causes the material to lose electrons and deteriorates at least a portion of the material. The term "corrosion inhibitor" generally refers to a material that inhibits corrosion to some degree (some or all corrosion). As described herein, corrosion inhibitor compounds may be utilized to enhance resistance to corrosion on downhole metal materials such as tubing.

Figure 1:
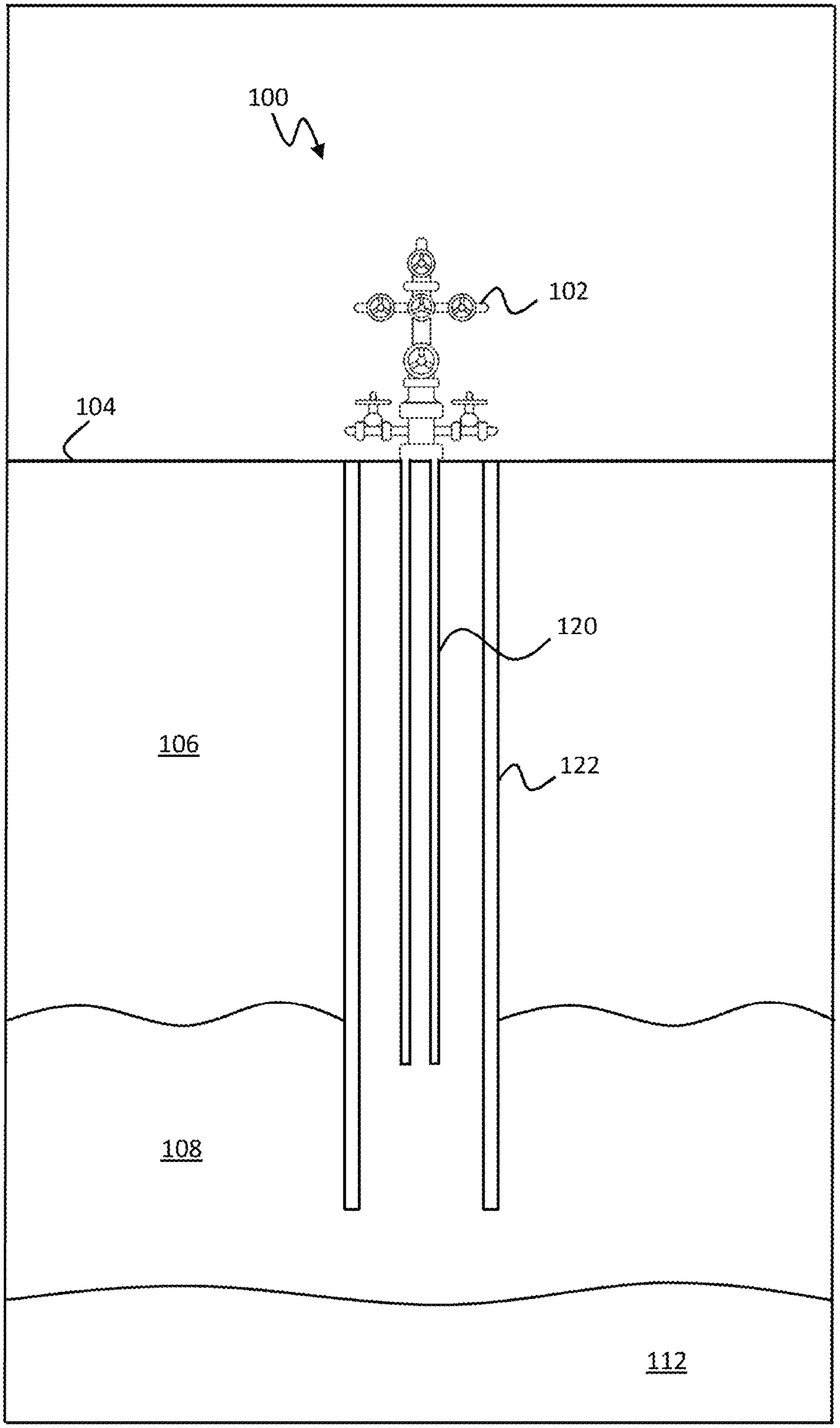
FIG. 1 schematically depicts a hydrocarbon extraction well, according to one or more embodiments shown and described herein.

Referring now to FIG. 1, a hydrocarbon extraction well 100 is schematically depicted, where the downhole region is a cross-sectional view through a diameter of the casting 122 and tubing 120. It should be understood that FIG. 1 is a simplified depiction of a hydrocarbon extraction well 100, and other non-depicted components on a hydrocarbon extraction well 100 may be present in real-world operation. The hydrocarbon extraction well 100 may extend from the surface 104, through a subterranean zone 106, and into a subsurface formation 108 that contains extractable hydrocarbons such as oil and/or gas. Subsurface zone 112 represents another subsurface formation that does not necessarily include extractable hydrocarbons. In general, the casing 122 may form a passage to the subsurface formation 108, where cementing may be present between the natural formation and the casing 122 (not shown in FIG. 1). A wellhead 102 may connect to tubing 120 that passes through the interior of the casing 122. In general, during hydrocarbon extraction, the hydrocarbons may flow upwards through the tubing 120 and to the wellhead 102. The tubing 120 may be metal in material, such as steel. In some embodiments, the tubing 120 may be carbon steel 120.

According to embodiments, acidizing treatments may be employed as a stimulation process intended to enlarge the natural pores in material such as rock in the subsurface formation 108 and, thus, facilitate the flow of hydrocarbons that results in an increased productivity for oil and/or gas producing facilities. In general, during acidizing treatments, an acidic treatment fluid may be injected into the subsurface formation 108 from the surface 104 through the tubing 120. The acidic treatment fluid used for such application may be highly acidic and may generally cause the tubing 120 through which it passes to corrode. As such, at least a portion of the tubing 122 (such as the interior surface) is exposed to an acidic environment during acidizing treatments.

According to one or more embodiments, the acidic treatment fluid may comprise one or more acids. A wide range of acids are contemplated as suitable in the processes described herein, and an acid may be selected based on the type of rock that is to be treated and/or the intended goals of the acidizing treatment. Without limitation, according to some embodiments, the one or more acids in the acid treatment fluid may be chosen from hydrochloric acid, formic acid, acetic acid hydrofluoric acid, nitric acid, sulfuric acid, hydrobromic acid, hydroiodic acid, perchloric acid, or chloric acid.

According to embodiments, the environment in which the tubing 122 experiences is acidic and may be extremely acidic. For example, according to one or more embodiments, the acidic environment in contact with the tubing 122 may have a pH of 6 or less. In additional embodiments, the pH of the acidic environment may be less than or equal to 5.5, less than or equal to 5, less than or equal to 4.5, less than or equal to 4, less than or equal to 3.5, less than or equal to 3, less than or equal to 2.5, or even less than or equal to 2.

Generally, the composition of the acidic treatment fluid and the amount used for acidizing treatment may determine the downhole acidity.

In general, the downhole conditions of the acidic environment that is contacting at least a portion of the tubing 122 may be relatively high temperature and/or relatively high pressure (sometimes referred to in industry as "HTHP"). For example, the acidic environment may have a temperature of at least 50° C., at least 100° C., at least 150° C., at least 200° C., at least 250° C., or even at least 300° C., in some embodiments up to 1000° C. The pressure of the acidic environment may be at least 250 psi, at least 500 psi, at least 750 psi, at least 1000 psi, at least 2000 psi, at least 3000 psi, at least 4000 psi, at least 5000 psi, at least 7500 psi, or even at least 10,000 psi, in some embodiments up to 30,000 psi. These HTHP conditions may degrade conventional corrosion inhibitor compounds. However, without being bound by theory, it is believed that the presently disclosed corrosion inhibitor compounds may not degrade or may degrade to a lesser degree at such temperatures and pressures as compared to conventional corrosion inhibitors.

According to embodiments, during acidizing, at least a portion of the tubing 122 may be contacted by one or more corrosion inhibitor compounds. In some embodiments, the corrosion inhibitor compound may be mixed into the acidic treatment fluid (or be a portion of the acidic treatment fluid). In other embodiments, the corrosion inhibitor compounds may be present in a solvent or carrier fluid and be injected before, after, or concurrently with the acidic treatment fluid.

Without being bound by theory, in some embodiments, it is believed that the corrosion inhibitor compound may form a film on the surface of the tubing 122, which may prevent corrosion. In other embodiments, a measurable film layer may not be formed, but corrosion on the tubing may none the less be mitigated. The amount of corrosion inhibitor compound utilized may be sufficient to mitigate corrosion, but is not particularly limiting in the embodiments described herein. For example, from several ppm (e.g., at least 2 ppm, at least 5 ppm, at least 25 ppm, at least 50 ppm, at least 100 ppm, at least 500 ppm, or even at least 1000 ppm) of corrosion inhibitor compound up to at least 1 wt. %, at least 5 wt. %, or even at least 10 wt. % of the corrosion inhibitor compound may be present in the acidic environment. In some embodiments, the amount of corrosion inhibitor compound may depend on the strength of the acid.

According to one or more embodiments, the corrosion inhibitor compound may have the chemical structure of Chemical Structure #1. In additional embodiments, the corrosion inhibitor compound may have the chemical structure of Chemical Structure #2. It is contemplated that multiple compounds that fit into the general structures of Chemical Structure #1 and/or Chemical Structure #2 may be utilized in combination.

Chemical Structure #1

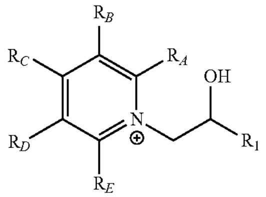

-continued

Chemical Structure #2

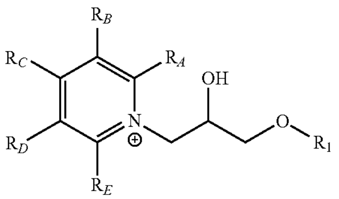

Referring to Chemical Structure #1 and #2, the general structure includes $R_1$, $R_A$, $R_B$, $R_C$, $R_D$, and $R_E$ that each represent various functional groups. Unless specified otherwise, discussion herein of R groups may refer to both the corrosion inhibitor compounds represented by Chemical Structure #1 or #2. $R_1$ may be a $C_1$-$C_{18}$ alkyl group, a $C_1$-$C_{18}$ hydroxyl alkyl group, a $C_1$-$C_{18}$ alkenyl group, a $C_1$-$C_{18}$ internal alkynl group, a $C_1$-$C_{18}$ acryl group, a $C_1$-$C_{18}$ cycloalkyl group, or a $C_1$-$C_{18}$ functional alkyl group. $R_A$, $R_B$, $R_C$, $R_D$, and $R_E$ may each independently chosen from hydrogen, a $C_1$-$C_{18}$ alkyl group, a $C_1$-$C_{18}$ hydroxyl alkyl group, a $C_1$-$C_{18}$ alkenyl group, a $C_1$-$C_{18}$ alkynl group, a $C_1$-$C_{18}$ acryl group, a $C_1$-$C_{18}$ cycloalkyl group, or a $C_1$-$C_{18}$ functional alkyl group. Without being bound by a theory, it is believed that one or more of $R_1$, $R_A$, $R_B$, $R_C$, $R_D$, and $R_E$ having a relatively long carbon chain moiety allows the corrosion inhibitor compound to better adhere to the surface of the tubing 122. Further, if the carbon chain moiety has greater than 18 carbon atoms, there may be an increased risk of the corrosion inhibitor compound has poor adherence to the tubing 122.

In one or more embodiments, the term "functional group" or "group" may refer to a substituent or moiety that is present in the corrosion inhibitor compound. For example, when the disclosure states that $R_1$ may be a methyl group, the methyl group ($—CH_3$) replaces $R_1$ of the general structure, where the carbon atom of the methyl group is now bonded to the carbon atom of the chemical structure to which $R_1$ bonded.

As described herein, moieties may be defined by the number of carbon atoms included in the moiety, such as $C_x$-$C_y$, where x is the least number of carbon atoms and y is the greatest number of carbon atoms contemplated. For example, $C_1$-$C_{18}$ describes a moiety that has from 1 to 18 carbon atoms.

In some embodiments, $R_1$, $R_A$, $R_B$, $R_C$, $R_D$, and $R_E$ may each independently be a $C_1$-$C_{15}$ alkyl group. The term "alkyl group" refers to a functional group that only contains carbon and hydrogen atoms where the carbon atoms and hydrogen atoms are only connected by single bonds. In some embodiments, $R_1$, $R_A$, $R_B$, $R_C$, $R_D$, and $R_E$ may each independently be a straight chained alkyl group having the chemical formula $—(CH_2)_xCH_3$, where x is from 0 to 17, such as 0 (a methyl group), 1, 2, 3, 4, 5, 6, 7, 8, 9, 10, 11, 12, 13, 14, 15, 16, 17, or 18 carbon atoms. In additional embodiments, $R_1$, $R_A$, $R_B$, $R_C$, $R_D$, and $R_E$ may each independently be branched alkyl groups having from 3 to 18 carbon atoms, such as 3, 4, 5, 6, 7, 8, 9, 10, 11, 12, 13, 14, 15, 16, 17, or 18 carbon atoms. In some embodiments, the alkyl group may include a ring structure, such as a pentane ring, a hexane ring, etc.

In some embodiments, $R_1$, $R_A$, $R_B$, $R_C$, $R_D$, and $R_E$ may each independently comprise a $C_1$-$C_{18}$ hydroxyl alkyl group. The term "hydroxyl alkyl group" refers to a functional group that includes one or more a hydroxyl moieties ($—OH$) bonded to an alkyl group. According to embodiments, the hydroxyl alkyl group may include 1, 2, 3, 4, 5, or even more hydroxyl moieties. In some embodiments, $R_1$, $R_A$, $R_B$, $R_C$, $R_D$, and $R_E$ may each independently be a straight chained hydroxyl alkyl group having the chemical formula $—(CH_2)_xOH$, where x is from 1 to 18. In additional embodiments, $R_1$, $R_A$, $R_B$, $R_C$, $R_D$, and $R_E$ may each independently be branched hydroxyl alkyl groups having from 1 to 18 carbon atoms and at least one hydroxyl group.

In some embodiments, $R_1$, $R_A$, $R_B$, $R_C$, $R_D$, and $R_E$ may each independently comprise a $C_1$-$C_{18}$ alkenyl group. The term "alkenyl group" refers to a functional group consisting of hydrogen and carbon atoms where at least two carbon atoms have a double bond. In some embodiments, the alkenyl group may have a single carbon to carbon double bond that is at the end of moiety (i.e., having the structure $—(CH_2)_xCH{=}CH_2$, where x is from 0 to 16, such as 0, 1, 2, 3, 4, 5, 6, 7, 8, 9, 10, 11, 12, 13, 14, 15, or 16).

In some embodiments, $R_1$, $R_A$, $R_B$, $R_C$, $R_D$, and $R_E$ may each independently comprise a $C_1$-$C_{18}$ alkynl group. The term "alkynyl group" refers to a functional group consisting of hydrogen and carbon atoms where at least two carbon atoms have a triple bond. In some embodiments, $R_A$, $R_B$, $R_C$, $R_D$, and $R_E$ may each independently have a single carbon to carbon triple bond that is at the end of moiety (i.e., having the structure $—(CH_2)_xC{\equiv}CH$, where x is from 0 to 16, such as 0, 1, 2, 3, 4, 5, 6, 7, 8, 9, 10, 11, 12, 13, 14, 15, or 16).

In some embodiments, $R_1$, $R_A$, $R_B$, $R_C$, $R_D$, and $R_E$ may each independently comprise one or more of a carbon-carbon double bond, a carbon-carbon triple bond, or a combination thereof, provided that $R_1$ does not comprise a terminal alkyne.

In some embodiments, $R_1$, $R_A$, $R_B$, $R_C$, $R_D$, and $R_E$ may each independently be a $C_1$-$C_{15}$ acryl group. The term "acryl group" refers to a functional group consisting of a carbon-carbon double bond and a carbon-oxygen double bond separated by a carbon-carbon single bond. The acryl group may have the general formula $—(CH_2)_nCOCHCH_2$, where n is any integer from 0 to 15, such as 0, 1, 2, 3, 4, 5, 6, 7, 8, 9, 10, 11, 12, 13, 14, or 15.

In some embodiments, $R_1$, $R_A$, $R_B$, $R_C$, $R_D$, and $R_E$ may each independently be a $C_1$-Cis functional alkyl group. The term "functional alkyl group" refers to an alkyl group which includes at least one moiety bonded to any carbon atom of the alkyl group. In some embodiments, the functional alkyl group may comprise more than one of the same moiety. In some embodiments, the functional alkyl group may comprise two or more different moieties. In some embodiments, the functional alkyl group may comprise a moiety chosen form a carboxyl group (i.e., $—COOH$), an amine group (i.e., $—NH_2$), or a thiol group (i.e., $—SH$).

In some embodiments, $R_1$ may be a $C_2$-$C_{17}$ alkyl group, and $R_A$, $R_B$, $R_C$, $R_D$, and $R_E$ may each be hydrogen. For example, $R_1$ may be a $C_4$-$C_{16}$ alkyl group, a $C_6$-$C_{14}$ alkyl group, or a $C_8$-$C_{12}$ alkyl group. In some embodiments, $R_1$ may be a $C_1$-$C_{17}$, a $C_1$-$C_{16}$, a $C_1$-$C_{15}$, a $C_1$-$C_{14}$, a $C_1$-$C_{13}$, a $C_1$-$C_{12}$, a $C_1$-$C_{11}$, a $C_1$-$C_{10}$, a $C_1$-$C_9$, a $C_1$-$C_8$, a $C_1$-$C_7$, a $C_1$-$C_6$, a $C_1$-$C_5$, a $C_1$-$C_4$, a $C_1$-$C_3$, or a $C_1$-$C_2$ alkyl group. In some embodiments, $R_1$ may be a $C_2$-$C_{18}$, $C_3$-$C_{18}$, $C_4$-$C_{18}$, $C_5$-$C_{18}$, $C_6$-$C_{18}$, $C_7$-$C_{18}$, $C_8$-$C_{18}$, $C_9$-$C_{18}$, $C_{10}$-$C_{18}$, $C_{11}$-$C_{18}$, $C_{12}$-$C_{18}$, $C_{13}$-$C_{18}$, $C_{14}$-$C_{18}$, $C_{15}$-$C_{18}$, $C_{16}$-$C_{18}$, or $C_{17}$-$C_{18}$ alkyl group. In one embodiment, $R_1$ may be a $C_{10}$ alkyl group (i.e., a decyl group) and $R_A$, $R_B$, $R_C$, $R_D$, and $R_E$ may each be hydrogen. In one embodiment, $R_1$ may be a $C_{12}$ alkyl group (i.e., a dodecyl group) and $R_A$, $R_B$, $R_C$, $R_D$, and $R_E$ may each be hydrogen.

Without being bound by a theory, it is believed that the corrosion inhibitor compound has relatively strong bonding to a metal surface due to both the physiorption and chemisorption of multiple parts of the corrosion inhibitor compound and the metal surface. The term "physiorption" refers to the physical bonding of liquid molecules onto a material's surface. Van der Waal interactions, or similar interactions, between atoms on the surface of a metal may cause these surface atoms to be reactive, thus causing them to attract molecules to satisfy the atomic force imbalance. It is believed that the presence of the positively-charged nitrogen atom of the corrosion inhibitor compound forms strong Van der Waal, or similar, interactions with the metal surface. The term "chemisorption" refers to the adsorption between a surface and an adsorbate due to chemical bonding. Multiple parts of the corrosion inhibitor compound including, but not limited to, the hydroxyl group and pyridinium group, may bond with the metal surface. It is believed that due to the increased number of functional groups on the corrosion inhibitor compound that can interact with a metal surface through physiorption and/or chemisorption, the corrosion inhibitor compound forms stronger interactions and bonds with a metal surface and, thus, provides the metal surface with a stronger and longer lasting corrosion-resistant film than many conventional compounds known to reduce corrosion.

Numerous technical aspects are presented in the present disclosure, listed below as Aspects 1-20.

Aspect 1. A method of acidizing a subsurface formation, the method comprising: injecting an acidic treatment fluid into an subsurface formation through a tubing of an extraction well, thereby exposing at least a portion of the tubing to an acidic environment; wherein at least a portion of the tubing is contacted by a corrosion inhibitor compound having the general structure of Chemical Structure #1; wherein: $R_1$ is a $C_1$-$C_{18}$ alkyl group, a $C_1$-$C_{18}$ hydroxyl alkyl group, a $C_1$-$C_{18}$ alkenyl group, a $C_1$-$C_{18}$ internal alkynl group, a $C_1$-$C_{18}$ acryl group, a $C_1$-$C_{18}$ cycloalkyl group, or a $C_1$-$C_{18}$ functional alkyl group; and $R_A$, $R_B$, $R_C$, $R_D$, and $R_E$ are each independently chosen from hydrogen, a $C_1$-$C_{18}$ alkyl group, a $C_1$-$C_{18}$ hydroxyl alkyl group, a $C_1$-$C_{18}$ alkenyl group, a $C_1$-$C_{18}$ alkynl group, a $C_1$-$C_{18}$ acryl group, a $C_1$-$C_{18}$ cycloalkyl group, or a $C_1$-$C_{18}$ functional alkyl group.

Aspect 2. The method of aspect 1, wherein $R_A$, $R_B$, $R_C$, $R_D$, and $R_E$ are each hydrogen.

Aspect 3. The method of aspect 1 or 2, wherein $R_1$ is a $C_1$-$C_{18}$ alkyl group.

Aspect 4. The method of any previous aspect, wherein the tubing is a metal material.

Aspect 5. The method of any previous aspect, wherein the tubing is carbon steel.

Aspect 6. The method of any previous aspect, wherein the acidic treatment fluid comprises one or more acids chosen from hydrochloric acid, formic acid, acetic acid hydrofluoric acid, nitric acid, sulfuric acid, hydrobromic acid, hydroiodic acid, perchloric acid, or chloric acid, or combinations thereof.

Aspect 7. The method of any previous aspect, wherein the acidic environment to which at a portion of the tubing is exposed has a pH of less than or equal to 6.

Aspect 8. The method of any previous aspect, wherein the acidic environment to which at least a portion of the tubing is exposed has a temperature of at least 50° C.

Aspect 9. The method of any previous aspect, wherein the acidic environment to which at a portion of the tubing is exposed has a pressure of at least 250 psi.

Aspect 10. The method of any previous aspect, wherein the acidic treatment fluid comprises the corrosion inhibitor compound.

Aspect 11. A method of acidizing a subsurface formation, the method comprising: injecting an acidic treatment fluid into an subsurface formation through a tubing of an extraction well, thereby exposing the tubing to an acidic environment; wherein at least a portion of the tubing is contacted by a corrosion inhibitor compound having the general structure of Chemical Structure #2; wherein: $R_1$ is a $C_1$-$C_{18}$ alkyl group, a $C_1$-$C_{18}$ hydroxyl alkyl group, a $C_1$-$C_{18}$ alkenyl group, a $C_1$-$C_{18}$ internal alkynl group, a $C_1$-$C_{18}$ acryl group, a $C_1$-$C_{18}$ cycloalkyl group, or a $C_1$-$C_{18}$ functional alkyl group; and $R_A$, $R_B$, $R_C$, $R_D$, and $R_E$ are each independently chosen from hydrogen, a $C_1$-$C_{18}$ alkyl group, a $C_1$-$C_{18}$ hydroxyl alkyl group, a $C_1$-$C_{18}$ alkenyl group, a $C_1$-$C_{18}$ alkynl group, a $C_1$-$C_{18}$ acryl group, a $C_1$-$C_{18}$ cycloalkyl group, or a $C_1$-$C_{18}$ functional alkyl group.

Aspect 12. The method of aspect 11, wherein $R_A$, $R_B$, $R_C$, $R_D$, and $R_E$ are each hydrogen.

Aspect 13. The method of aspect 11 or 12, wherein $R_1$ is a $C_1$-$C_{18}$ alkyl group.

Aspect 14. The method of any of aspects 11-13, wherein the tubing is a metal material.

Aspect 15. The method of any of aspects 11-14, wherein the tubing is carbon steel.

Aspect 16. The method of any of aspects 11-15, wherein the acidic treatment fluid comprises one or more acids chosen from hydrochloric acid, formic acid, acetic acid hydrofluoric acid, nitric acid, sulfuric acid, hydrobromic acid, hydroiodic acid, perchloric acid, or chloric acid, or combinations thereof.

Aspect 17. The method of any of aspects 11-16, wherein the acidic environment to which at least a portion of the tubing is exposed has a pH of less than or equal to 6.

Aspect 18. The method of any of aspects 11-17, wherein the acidic environment to which at a portion of the tubing is exposed has a temperature of at least 50° C.

Aspect 19. The method of any of aspects 11-18, wherein the acidic environment to which at a portion of the tubing is exposed has a pressure of at least 250 psi.

Aspect 20. The method of any of aspects 11-19, wherein the acidic treatment fluid comprises the corrosion inhibitor compound.

EXAMPLES

Examples are provided herein which may disclose one or more embodiments of the present disclosure. However, the Examples should not be viewed as limiting on the claimed embodiments hereinafter provided.

Example 1—Synthesis of 1-(2-Hydroxydodecyl)Pyridinium Chloride

Pyridine (1.5 mmol) and hydrochloric acid (1 mmol) were added to a round bottom flask, purged with nitrogen, and stirred at room temperature (25° C.) for 10 minutes. Then, 1,2-epoxydodecane (1 mmol) was added to the flask along with a volume of water equivalent to the volume of the added hydrochloric acid. The reaction mixture was stirred again for 30 minutes, then heated to 100° C. for 15 hours. At the end of the elapsed time, the excess pyridine was removed from the final solution via rotary evaporation. Diethyl ether was added to precipitate the final 1-(2-hydroxydodecyl) pyridinium compound as a white color material which was further dried at 50° C. in oven to get a white powder. The pyridine, 1,2-epoxydodecane, hydrochloric acid (37%), dichloromethane, and diethyl ether were purchased from Sigma-Aldrich.

Figure 2A:
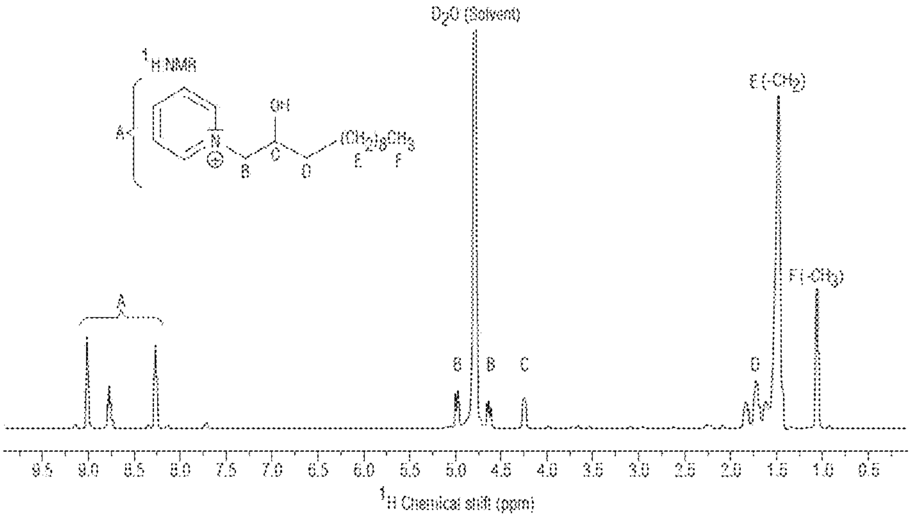
FIG. 2A graphically depicts the $^1H$ NMR spectrum of a synthesized 1-(2-hydroxyalkyl) pyridinium compound (1-(2-hydroxydodecyl)pyridinium chloride), according to one or more embodiments shown and described herein.
Figure 2B:
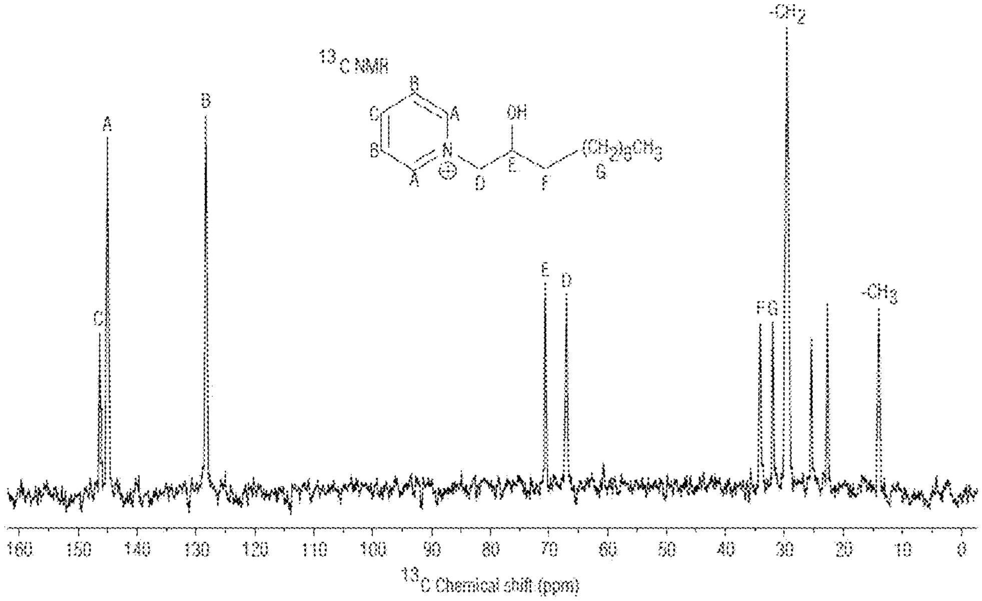
FIG. 2B graphically depicts the $^{13}C$ NMR spectrum of a synthesized 1-(2-hydroxyalkyl) pyridinium compound (1-(2-hydroxydodecyl)pyridinium chloride), according to one or more embodiments shown and described herein.

The synthesized polymers were characterized using $^1$H and $^{13}$C NMR spectroscopy. A Varian 500 MHz VNMRS spectrometer and a JEOL 500 MHz NMR spectrometer were utilized to obtain spectra using appropriate acquisition parameters. The NMR analyses were carried in deuterated water ($D_2O$) and deuterated trimethylsilyl propanoic acid (0 ppm) was used a reference for chemical shift. The $^1$H NMR analysis confirmed the structures of the bis-quaternary ammonium compound. FIG. 2A provides the $^1$H NMR spectrum and FIG. 2B provides the $^{13}$C NMR spectrum of 1-(2-hydroxydodecyl)pyridinium chloride. The resulting chemical structure was as depicted in Chemical Structure #3:

Chemical Structure #3

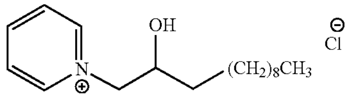

Example 2—Synthesis of 1-[3-(Decyloxy)-2-Hydroxypropyl]Pyridinium Chloride

Pyridine (1.5 mol) and hydrochloric acid (1 mol) were added to a round bottom flask and purged with nitrogen and stirred at room temperature (25° C.) for 10 minutes. Then, decyl glycidyl ether (1 mol) was added to the flask and again stirred for 30 minutes and then the contents of the flask were heated at 110° C. for 6 hours. At the end of this elapsed time, excess pyridine was removed from the final solution using a rotavapor.

The final solution was added to a separating funnel and dichloromethane ($CH_2Cl_2$) and a saturated solution of NaCl in water and potassium carbonate ($K_2CO_3$) was added to separate the organic and aqueous phases. The organic phase was collected and a rotavapor was used to remove the organic solvent and dark brown gel-like 1-[3-(decyloxy)-2-hydroxypropyl]pyridinium chloride was collected. The pyridine, decyl glycidyl ether, hydrochloric acid (37%), dichloromethane, and diethyl ether were purchased from Sigma-Aldrich and used without any further purification.

Figure 3A:
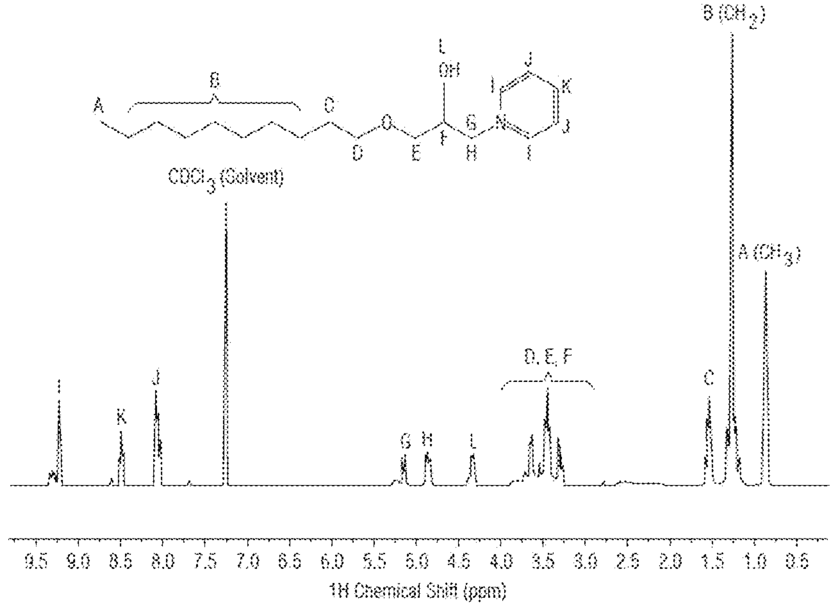
FIG. 3A graphically depicts the H-NMR spectrum of a synthesized pyridinium hydroxyl alkyl ether compound (1-[3-(decyloxy)-2-hydroxypropyl]pyridinium chloride), according to one or more embodiments shown and described herein.
Figure 3B:
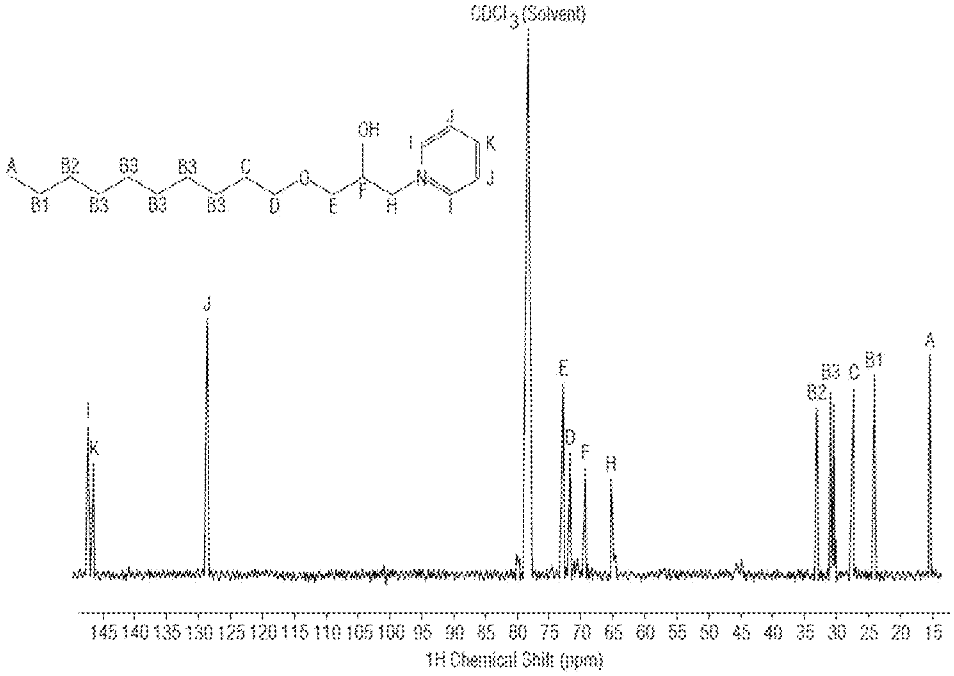
FIG. 3B graphically depicts the C-NMR spectrum of a synthesized pyridinium hydroxyl alkyl ether compound (1-[3-(decyloxy)-2-hydroxypropyl]pyridinium chloride), according to one or more embodiments shown and described herein.

The final solution was added to a separating funnel and dichloromethane ($CH_2Cl_2$) and a saturated solution of NaCl in water and potassium carbonate ($K_2CO_3$) was added to separate the organic and aqueous phases. The organic phase was collected and a rotavapor was used to remove the organic solvent and dark brown gel-like 1-[3-(decyloxy)-2-hydroxypropyl]pyridinium chloride was collected. FIG. 3A provides the H-NMR spectrum and FIG. 3B provides the C-NMR spectrum of this formed 1-[3-(decyloxy)-2-hydroxypropyl]pyridinium chloride. The resulting chemical structure was as depicted in Chemical Structure #4:

Chemical Structure #4

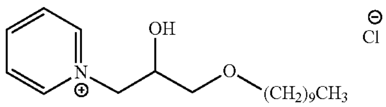

Example 3—Synthesis of 1-[3-(Hexadecyloxy)-2-Hydroxypropyl]Pyridinium Chloride 1-[3-(hexadecyloxy)-2-hydroxypropyl]pyridinium chloride was prepared by a method similar to that of Example 2, where hexadecyl glycidyl ether was used rather than decyl glycidyl ether. The resulting chemical structure was as depicted in Chemical Structure #5:

Chemical Structure #5

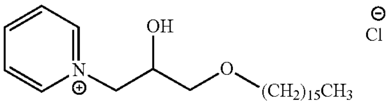

Example 4—Corrosion Resistance Testing

A high temperature and high pressure autoclave rotating cage test (also described hereinabove) was used to measure the corrosion inhibition efficiency of developed formulations. A one-liter reactor was constructed from C-276 alloy to withstand a harsh corrosive environment. The test material was API 5CT C95 steel coupons and the coupons were cleaned and degreased before and after testing following the ASTM G1 "Practice for preparing, cleaning and evaluating corrosion test specimen procedure", the entirety of which is hereby incorporated by reference. Prior to each test, a coupon was polished with a 600 grit finish size. The coupon was then washed with xylene to remove any oily layer formed during the polishing process. Next, the coupon was washed with water and then washed with acetone. The coupon's initial weight was obtain and a photo of the coupon was taken. A 15 weight percent (wt. %) HCl was transferred into a glass test container containing 0.25 wt. % of one the compounds of Examples 1-3 to create a test solution. For the blank, only HCl was present in the test solution. Then, the coupon was hung by a Teflon wire and connected to a glass rod avoiding any metal contact. The coupon was immersed into the test solution without touching the bottom of the glass test container. Then, the glass test container was placed inside the reactor. The reactor was sealed and initially pressurized with 1450 pounds per square inch (psi) of $N_2$ gas and then the vessel heater was switched on to reach 120° C. temperature and the final pressure was 2000 psi. The experiment duration was 6 hours including the heating and cooling cycles. After the test, the specimen was taken out, cleaned, visually inspected, re-weighted, and photographed.

The corrosion loss, normalized for surface area was calculated in pounds per square foot, and is shown in Table 1. Also, total weight loss is reported in Table 1, as well as corrosion inhibitor efficiency, based on the corrosion loss, calculated as:

$$\text{Inhibition Efficiency (\%)} = \frac{CR_{blank} - CR_{inhibitor}}{CR_{blank}} \times 100$$

TABLE 1

| | Corrosion Loss (lb/ft$^2$) | Corrosion Inhibition Efficiency | Corrosion Weight Loss |
|---|---|---|---|
| No Corrosion Inhibitor | 1.38 | N/A | 67% |
| Example 1 Compound | 0.220 | 84% | 10% |
| Example 2 Compound | 0.183 | 87% | 8% |
| Example 3 Compound | 0.268 | 80% | 12% |

Figure 4:
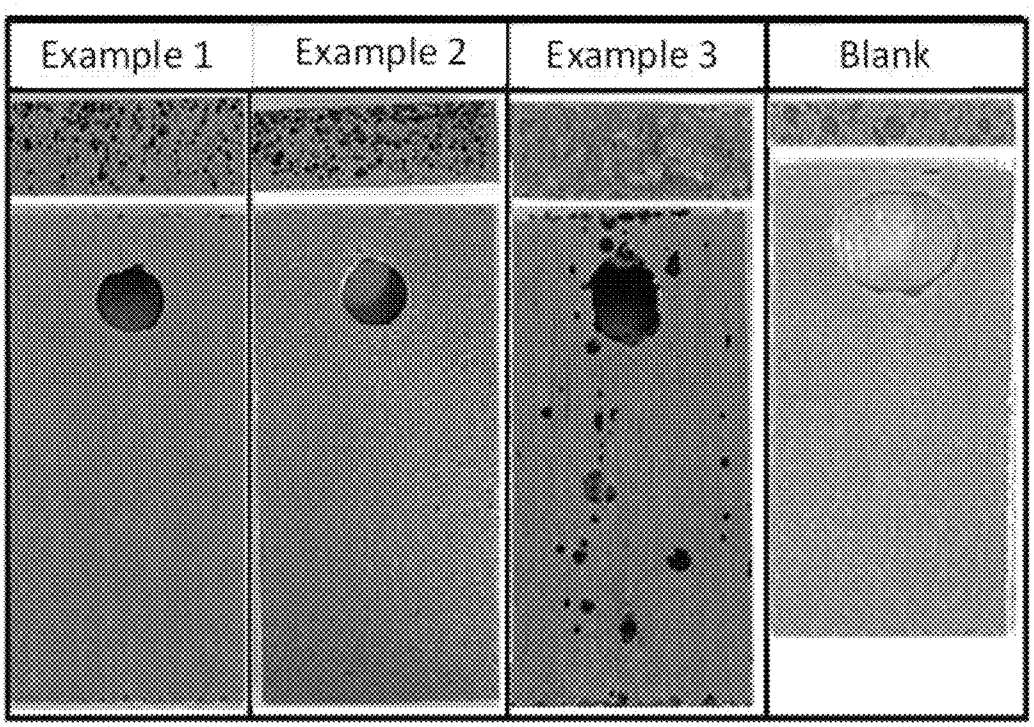
FIG. 4 depicts images of test coupons without the use of any corrosion inhibitors compared to the test coupons used with 0.25 wt. % of example corrosion inhibitors, according to one or more embodiments shown and described herein.

Also, FIG. 4 depicts images of the respective coupons following testing.

The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that where a first component is described as "comprising" a second component, it is contemplated that, in some embodiments, the first component "consists" or "consists essentially of" that second component. It should further be understood that where a first component is described as "comprising" a second component, it is contemplated that, in some embodiments, the first component comprises at least 10%, at least 20%, at least 30%, at least 40%, at least 50%, at least 60%, at least 70%, at least 80%, at least 90%, at least 95%, or even at least 99% that second component (where % can be weight % or molar %).

It is also noted that recitations herein of "at least one" component, element, etc., should not be used to create an inference that the alternative use of the articles "a" or "an" should be limited to a single component, element, etc.

For the purposes of describing and defining the presently disclosed technology it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

What is claimed is:

1. A method of acidizing a subsurface formation, the method comprising:

injecting an acidic treatment fluid into a subsurface formation through a tubing of an extraction well, thereby exposing at least a portion of the tubing to an acidic environment;

wherein at least a portion of the tubing is contacted by a corrosion inhibitor compound having the general structure:

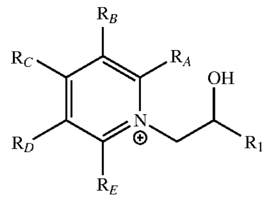

wherein:

$R_1$ is a $C_1$-$C_{18}$ alkyl group, a $C_1$-$C_{18}$ hydroxyl alkyl group, a $C_1$-$C_{18}$ alkenyl group, a $C_1$-$C_{18}$ internal alkynl group, a $C_1$-$C_{18}$ acryl group, a $C_1$-$C_{18}$ cycloalkyl group, or a $C_1$-$C_{18}$ functional alkyl group; and $R_A$, $R_B$, $R_C$, $R_D$, and $R_E$ are each independently chosen from hydrogen, a $C_1$-$C_{18}$ alkyl group, a $C_1$-$C_{18}$ hydroxyl alkyl group, a $C_1$-$C_{18}$ alkenyl group, a $C_1$-$C_{18}$ alkynl group, a $C_1$-$C_{18}$ acryl group, a $C_1$-$C_{18}$ cycloalkyl group, or a $C_1$-$C_{18}$ functional alkyl group.

2. The method of claim 1, wherein $R_A$, $R_B$, $R_C$, $R_D$, and $R_E$ are each hydrogen.

3. The method of claim 1, wherein $R_1$ is a $C_1$-$C_{18}$ alkyl group.

4. The method of claim 1, wherein the tubing is a metal material.

5. The method of claim 1, wherein the tubing is carbon steel.

6. The method of claim 1, wherein the acidic treatment fluid comprises one or more acids chosen from hydrochloric acid, formic acid, acetic acid hydrofluoric acid, nitric acid, sulfuric acid, hydrobromic acid, hydroiodic acid, perchloric acid, or chloric acid, or combinations thereof.

7. The method of claim 1, wherein the acidic environment to which at a portion of the tubing is exposed has a pH of less than or equal to 6.

8. The method of claim 1, wherein the acidic environment to which at least a portion of the tubing is exposed has a temperature of at least 50° C.

9. The method of claim 1, wherein the acidic environment to which at a portion of the tubing is exposed has a pressure of at least 250 psi.

10. The method of claim 1, wherein the acidic treatment fluid comprises the corrosion inhibitor compound.

11. A method of acidizing a subsurface formation, the method comprising:

injecting an acidic treatment fluid into a subsurface formation through a tubing of an extraction well, thereby exposing the tubing to an acidic environment;

wherein at least a portion of the tubing is contacted by a corrosion inhibitor compound having the general structure:

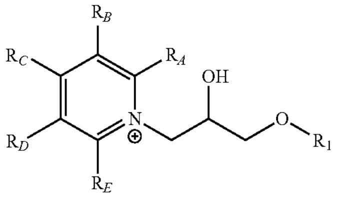

wherein:

$R_1$ is a $C_1$-$C_{18}$ alkyl group, a $C_1$-$C_{18}$ hydroxyl alkyl group, a $C_1$-$C_{18}$ alkenyl group, a $C_1$-$C_{18}$ internal alkynl group, a $C_1$-$C_{18}$ acryl group, a $C_1$-$C_{18}$ cycloalkyl group, or a $C_1$-$C_{18}$ functional alkyl group; and $R_A$, $R_B$, $R_C$, $R_D$, and $R_E$ are each independently chosen from hydrogen, a $C_1$-$C_{18}$ alkyl group, a $C_1$-$C_{18}$ hydroxyl alkyl group, a $C_1$-$C_{18}$ alkenyl group, a $C_1$-$C_{18}$ alkynl group, a $C_1$-$C_{18}$ acryl group, a $C_1$-$C_{18}$ cycloalkyl group, or a $C_1$-$C_{18}$ functional alkyl group.

12. The method of claim 11, wherein $R_A$, $R_B$, $R_C$, $R_D$, and $R_E$ are each hydrogen.

13. The method of claim 11, wherein $R_1$ is a $C_1$-$C_{18}$ alkyl group.

14. The method of claim 11, wherein the tubing is a metal material.

15. The method of claim 11, wherein the tubing is carbon steel.

16. The method of claim 11, wherein the acidic treatment fluid comprises one or more acids chosen from hydrochloric acid, formic acid, acetic acid hydrofluoric acid, nitric acid, sulfuric acid, hydrobromic acid, hydroiodic acid, perchloric acid, or chloric acid, or combinations thereof.

17. The method of claim 11, wherein the acidic environment to which at least a portion of the tubing is exposed has a pH of less than or equal to 6.

18. The method of claim 11, wherein the acidic environment to which at a portion of the tubing is exposed has a temperature of at least 50° C.

19. The method of claim 11, wherein the acidic environment to which at a portion of the tubing is exposed has a pressure of at least 250 psi.

20. A method of acidizing a subsurface formation, the method comprising:

injecting an acidic treatment fluid into a subsurface formation through a tubing of an extraction well, thereby exposing at least a portion of the tubing to an acidic environment;

wherein at least a portion of the tubing is contacted by a corrosion inhibitor compound having the general structure:

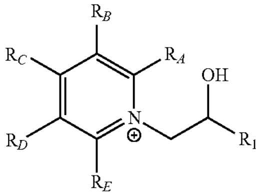

wherein:

$R_1$ is a $C_1$-$C_{18}$ alkyl group; and $R_A$, $R_B$, $R_C$, $R_D$, and $R_E$ are each hydrogen.

* * * * *